US008874041B2

(12) United States Patent
Nukala et al.

(10) Patent No.: US 8,874,041 B2
(45) Date of Patent: Oct. 28, 2014

(54) ELECTRONIC DEVICE WITH SERVICE ACQUISITION ANTENNA SWITCHING

(75) Inventors: Gaurav Nukala, Sunnyvale, CA (US); Johnson O. Sebeni, Fremont, CA (US); Longda Xing, San Jose, CA (US); Venkatasubramanian Ramasamy, Dublin, CA (US); Sachin J. Sane, Santa Clara, CA (US); Tahir Shamim, San Jose, CA (US)

(73) Assignee: Apple Inc., Cupertino, CA (US)

( * ) Notice: Subject to any disclaimer, the term of this patent is extended or adjusted under 35 U.S.C. 154(b) by 418 days.

(21) Appl. No.: 13/252,045

(22) Filed: Oct. 3, 2011

(65) Prior Publication Data
US 2013/0084807 A1 Apr. 4, 2013

(51) Int. Cl.
*H04B 15/00* (2006.01)
*H04B 17/00* (2006.01)
*H04W 48/18* (2009.01)
*H04W 48/16* (2009.01)

(52) U.S. Cl.
CPC ........... *H04B 17/0057* (2013.01); *H04W 48/18* (2013.01); *H04B 17/0077* (2013.01); *H04W 48/16* (2013.01)
USPC ........ 455/63.3; 455/62; 455/63.4; 455/562.1; 455/466; 455/557; 455/427; 455/561; 455/450; 455/11.1; 455/3.05; 370/328; 370/310; 370/208; 370/465; 370/331

(58) Field of Classification Search
USPC ............. 455/62, 63.4, 562.1, 3.05, 466, 557, 455/450, 452.1, 509, 452.2, 427, 12.1, 561, 455/11.1, 77, 82, 454, 552.1, 73, 277.2, 455/101, 133, 67.11, 404.2, 517, 506, 434, 455/428; 370/328, 310, 208, 252, 331, 329, 370/343, 480, 334, 339, 295, 476, 389, 465
See application file for complete search history.

(56) References Cited

U.S. PATENT DOCUMENTS 4,549,311 A * 10/1985 McLaughlin ............... 455/277.1
6,052,585 A * 4/2000 Homma ...................... 455/426.1
(Continued)

FOREIGN PATENT DOCUMENTS

| CN | 1250234 | 4/2000 |
|---|---|---|
| CN | 1524356 | 8/2004 |

(Continued)

OTHER PUBLICATIONS

Haewoon Nam et al., "Performance analysis of joint switched diversity and adaptive modulation", IEEE Transactions on Wireless Communications, IEEE Service Center, Piscataway, NJ, US, vol. 7, No. 10, Oct. 1, 2008, pp. 3780-3790.

*Primary Examiner* — Ganiyu A Hanidu
(74) *Attorney, Agent, or Firm* — Treyz Law Group; G. Victor Treyz; Michael H. Lyons

(57) ABSTRACT

An electronic device may contain wireless communication circuitry. The wireless communication circuitry may include radio-frequency transceiver circuitry coupled to multiple antennas. The electronic device may use the multiple antennas to make received signal power measurements. The signal power measurements may be made for each frequency in a list of frequencies used most recently by the electronic device in conveying data traffic between the electronic device and a wireless network. Based on received signal power measurements, the electronic device may select which frequency to use in performing system acquisition operations to attempt to establish a wireless communications link between the electronic device and the wireless network. The device may make signal power measurements for each antenna in the device to determine which antenna should be used in performing the system acquisition operations or may rotate through antennas in sequence to identify an antenna that can successfully perform system acquisition operations.

20 Claims, 5 Drawing Sheets

(56) References Cited

U.S. PATENT DOCUMENTS

| | | | |
|---|---|---|---|
| 6,456,856 B1 | 9/2002 | Werling et al. | |
| 7,546,624 B2 * | 6/2009 | Vishloff et al. | 725/62 |
| 8,457,585 B2 * | 6/2013 | Smith et al. | 455/296 |
| 2002/0141374 A1 * | 10/2002 | Boetzel et al. | 370/343 |
| 2004/0213178 A1 * | 10/2004 | Hood, III | 370/328 |
| 2005/0113039 A1 | 5/2005 | Tsukamoto | |
| 2006/0094486 A1 | 5/2006 | Cho | |
| 2007/0232309 A1 | 10/2007 | Koszarsky | |
| 2009/0196372 A1 * | 8/2009 | Zhang et al. | 375/267 |
| 2009/0278750 A1 | 11/2009 | Man et al. | |
| 2010/0297962 A1 * | 11/2010 | Rofougaran | 455/88 |
| 2011/0176635 A1 * | 7/2011 | Hochwald et al. | 375/299 |

FOREIGN PATENT DOCUMENTS

| | | |
|---|---|---|
| CN | 1619979 | 5/2005 |
| CN | 1767399 | 5/2006 |
| CN | 101582539 | 11/2009 |
| EP | 0620657 | 10/1994 |
| EP | 1283608 | 2/2003 |
| EP | 1533919 | 5/2005 |
| WO | 0215412 | 2/2002 |
| WO | 2006042399 | 4/2006 |

* cited by examiner

ELECTRONIC DEVICE WITH SERVICE ACQUISITION ANTENNA SWITCHING

This relates generally to wireless communications circuitry, and more particularly, to electronic devices that have wireless communication circuitry with multiple antennas.

Electronic devices such as portable computers and cellular telephones are often provided with wireless communications capabilities. For example, electronic devices may use long-range wireless communication circuitry such as cellular telephone circuitry and WiMax (IEEE 802.16) circuitry. Electronic devices may also use short-range wireless communications circuitry such as WiFi® (IEEE 802.11) circuitry and Bluetooth® circuitry.

When powered up or following an out-of-service condition, an electronic device such as a cellular telephone performs service acquisition procedures. Using these procedures, the electronic device may establish a communications link with a wireless base station. Once the link has been established, the electronic device may wirelessly transmit and receive data traffic.

During operation of an electronic device such as a cellular telephone, it may sometimes be necessary to operate the device in less than optimal conditions. For example, a user may sometimes operate an electronic device near the edge of a cell or in other locations in which signal strength is poor. In some operation environments, an external object such as part of a user's body may be located in the vicinity of a device antenna and can affect wireless performance. In operating environments such as these, it may sometimes be difficult for a device to successfully complete service acquisition procedures.

It would therefore be desirable to be able to provide improved ways for electronic devices to perform service acquisition procedures.

SUMMARY

An electronic device may be provided that contains wireless communication circuitry. The wireless communication circuitry may include radio-frequency transceiver circuitry coupled to multiple antennas. The electronic device may be a device that contains a first antenna located in an upper portion of the device and a second antenna located in a lower portion of the device or may be a device that contains three or more antennas.

During operation, the electronic device may maintain a list of frequencies used most recently by the electronic device in conveying data traffic between the electronic device and a wireless network.

The electronic device may make received signal power measurements. The received signal power measurements may be made for each frequency in the list of recently used frequencies. Based on the received signal power measurements or other signal measurements, the electronic device may select which frequency to use in performing system acquisition operations to attempt to establish a wireless communications link between the electronic device and the wireless network.

The device may make signal power measurements for each antenna in the device to determine which antenna should be used in performing the system acquisition operations or the device may cycle through each of the antennas in sequence to determine whether any of the antennas can successfully perform system acquisition operations.

Further features of the invention, its nature and various advantages will be more apparent from the accompanying drawings and the following detailed description of the preferred embodiments.

DETAILED DESCRIPTION

Electronic devices may be provided with wireless communication circuitry. The wireless communications circuitry in a device may be used to support wireless communications in multiple wireless communication bands. The wireless communication circuitry may include multiple antennas. The antennas may be used in a single antenna mode or in a multiple antenna mode (e.g., a dual antenna mode). Control circuitry within a device may select which antenna (or antennas) to use based on signal strength measurements and other criteria.

The antennas can include loop antennas, inverted-F antennas, strip antennas, planar inverted-F antennas, slot antennas, hybrid antennas that include antenna structures of more than one type, or other suitable antennas. Conductive structures for the antennas may be formed from conductive electronic device structures such as conductive housing structures (e.g., a ground plane and part of a peripheral conductive housing member or other housing structures), traces on substrates such as traces on plastic, glass, or ceramic substrates, traces on flexible printed circuit boards ("flex circuits"), traces on rigid printed circuit boards (e.g., fiberglass-filled epoxy boards), sections of patterned metal foil, wires, strips of conductor, other conductive structures, or conductive structures that are formed from a combination of these structures.

Figure 1:
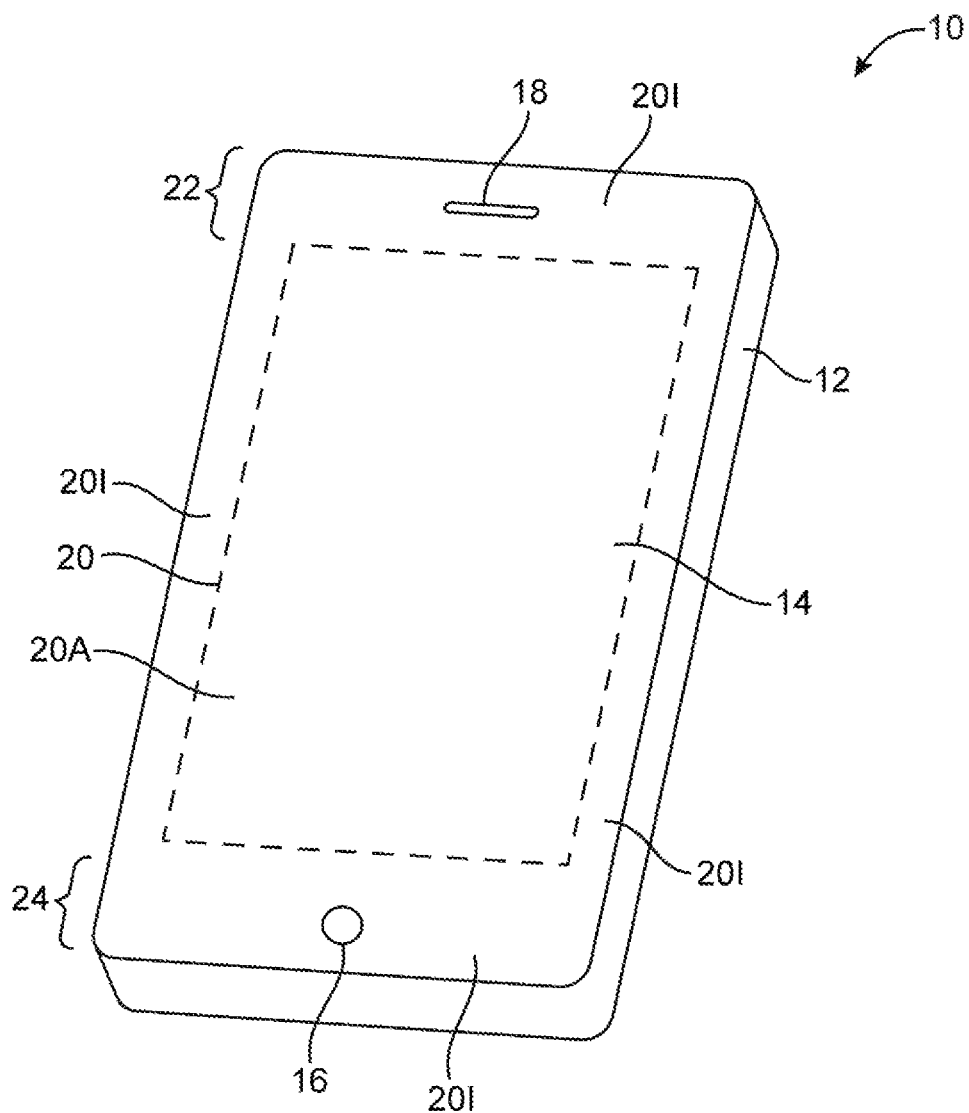
FIG. 1 is a perspective view of an illustrative electronic device with wireless communication circuitry having multiple antennas in accordance with an embodiment of the present invention.

An illustrative electronic device of the type that may be provided with one or more antennas (e.g., two antennas, three antennas, four antennas, five or more antennas, etc.) is shown in FIG. 1. Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a cellular telephone, a media player, a gaming device, etc.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may, for example, be a touch screen that incorporates capacitive touch electrodes. Display 14 may include image pixels formed from light-emitting diodes (LEDs), organic LEDs (OLEDs), plasma cells, electronic ink elements, liquid crystal display (LCD) components, or other suitable image pixel structures. A cover glass layer may cover the surface of display 14. Portions of display 14 such as peripheral regions 201 may be inactive and may be devoid of image pixel structures. Portions of display 14 such as rectangular central portion 20A (bounded by dashed line 20) may correspond to the active part of display 14. In active display region 20A, an array of image pixels may be used to display images for a user.

The cover glass layer that covers display 14 may have openings such as a circular opening for button 16 and a speaker port opening such as speaker port opening 18 (e.g., for an ear speaker for a user). Device 10 may also have other openings (e.g., openings in display 14 and/or housing 12 for accommodating volume buttons, ringer buttons, sleep buttons, and other buttons, openings for an audio jack, data port connectors, removable media slots, etc.).

Housing 12 may include a peripheral conductive member such as a bezel or band of metal that runs around the rectangular outline of display 14 and device 10 (as an example). The peripheral conductive member may be used in forming the antennas of device 10, if desired.

Antennas may be located along the edges of device 10, on the rear or front of device 10, as extending elements or attachable structures, or elsewhere in device 10. With one suitable arrangement, which is sometimes described herein as an example, device 10 may be provided with one or more antennas at lower end 24 of housing 12 and one or more antennas at upper end 22 of housing 12. Locating antennas at opposing ends of device 10 (i.e., at the narrower end regions of display 14 and device 10 when device 10 has an elongated rectangular shape of the type shown in FIG. 1) may allow these antennas to be formed at an appropriate distance from ground structures that are associated with the conductive portions of display 14 (e.g., the pixel array and driver circuits in active region 20A of display 14).

If desired, a first cellular telephone antenna may be located in region 24 and a second cellular telephone antenna may be located in region 22. Antenna structures for handling satellite navigation signals such as Global Positioning System signals or wireless local area network signals such as IEEE 802.11 (WiFi®) signals or Bluetooth® signals may also be provided in regions 22 and/or 24 (either as separate additional antennas or as parts of the first and second cellular telephone antennas). Antenna structures may also be provided in regions 22 and/or 24 to handle WiMax (IEEE 802.16) signals.

In regions 22 and 24, openings may be formed between conductive housing structures and printed circuit boards and other conductive electrical components that make up device 10. These openings may be filled with air, plastic, or other dielectrics. Conductive housing structures and other conductive structures may serve as a ground plane for the antennas in device 10. The openings in regions 22 and 24 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element such as an inverted-F antenna resonating element formed from part of a conductive peripheral housing structure in device 10 from the ground plane, or may otherwise serve as part of antenna structures formed in regions 22 and 24.

Antennas may be formed in regions 22 and 24 that are identical (i.e., antennas may be formed in regions 22 and 24 that each cover the same set of cellular telephone bands or other communications bands of interest). Due to layout constraints or other design constraints, it may not be desirable to use identical antennas. Rather, it may be desirable to implement the antennas in regions 22 and 24 using different designs. For example, the first antenna in region 24 may cover all cellular telephone bands of interest (e.g., four or five bands) and the second antenna in region 22 may cover a subset of the four or five bands handled by the first antenna. Arrangements in which the antenna in region 24 handles a subset of the bands handled by the antenna in region 22 (or vice versa) may also be used. Tuning circuitry may be used to tune this type of antenna in real time to cover a either a first subset of bands or a second subset of bands and thereby cover all bands of interest.

The use of device housing structures and antenna layouts of the type shown in FIG. 1 is merely illustrative. Electronic device 10 may have the shape of a tablet computer, may be implemented using device housings with other portable shapes, or may be implemented as part of other suitable electronic equipment. Two or more antennas, three or more antennas, four or more antennas, or other suitable number of antennas may be used in device 10.

In response to a power-up event or following an out-of-service condition, device 10 may perform service acquisition operations to establish a wireless communications link between device 10 and a cellular base station. Antenna operation can be disrupted when an antenna in device 10 is blocked by an external object such as a user's hand, when device 10 is placed near other external objects that interfere with proper antenna operation, or due to other factors (e.g., device orientation relative to its surroundings, etc.). Wireless communications can also be affected by the distance between device 10 and the base station, radio-frequency interference, and other environmental effects. When antenna operation is disrupted, there is a risk that service acquisition operations will be adversely affected.

To ensure that service acquisition operations are completed successfully, even in adverse operating environments such as when one of the antennas in device 10 is blocked, device 10 can use multiple antennas in performing service acquisition operations. For example, if one antenna is performing poorly (e.g., when signal strength is low), device 10 can switch to an alternate antenna to perform service acquisition operations. If desired, device 10 can evaluate signal strengths using both antennas and can, based on these measurements, perform system acquisition operations using whichever antenna (and frequency) is associated with the largest signal strength. Using schemes such as these or other suitable control schemes, device 10 can use multiple antennas to ensure that system acquisition operations are performed satisfactorily.

Device 10 may use an antenna selection algorithm to select an antenna for use during system acquisition operations. The antenna selection algorithm may run on the circuitry of device 10 and can be used to automatically select an appropriate antenna to use in real time. The antenna selection (switching) algorithm may select an appropriate antenna to use by evaluating signal strengths associated with various frequencies (channels) and, if desired, by evaluating signal strengths associated with each antenna.

Arrangements in which device 10 has a primary antenna and a secondary antenna are sometimes described herein as an example. This is, however, merely illustrative. Device 10 may use three or more antennas if desired. Device 10 may use antennas that are substantially identical (e.g., in band coverage, in efficiency, etc.), or may use other types of antenna configurations.

Figure 2:
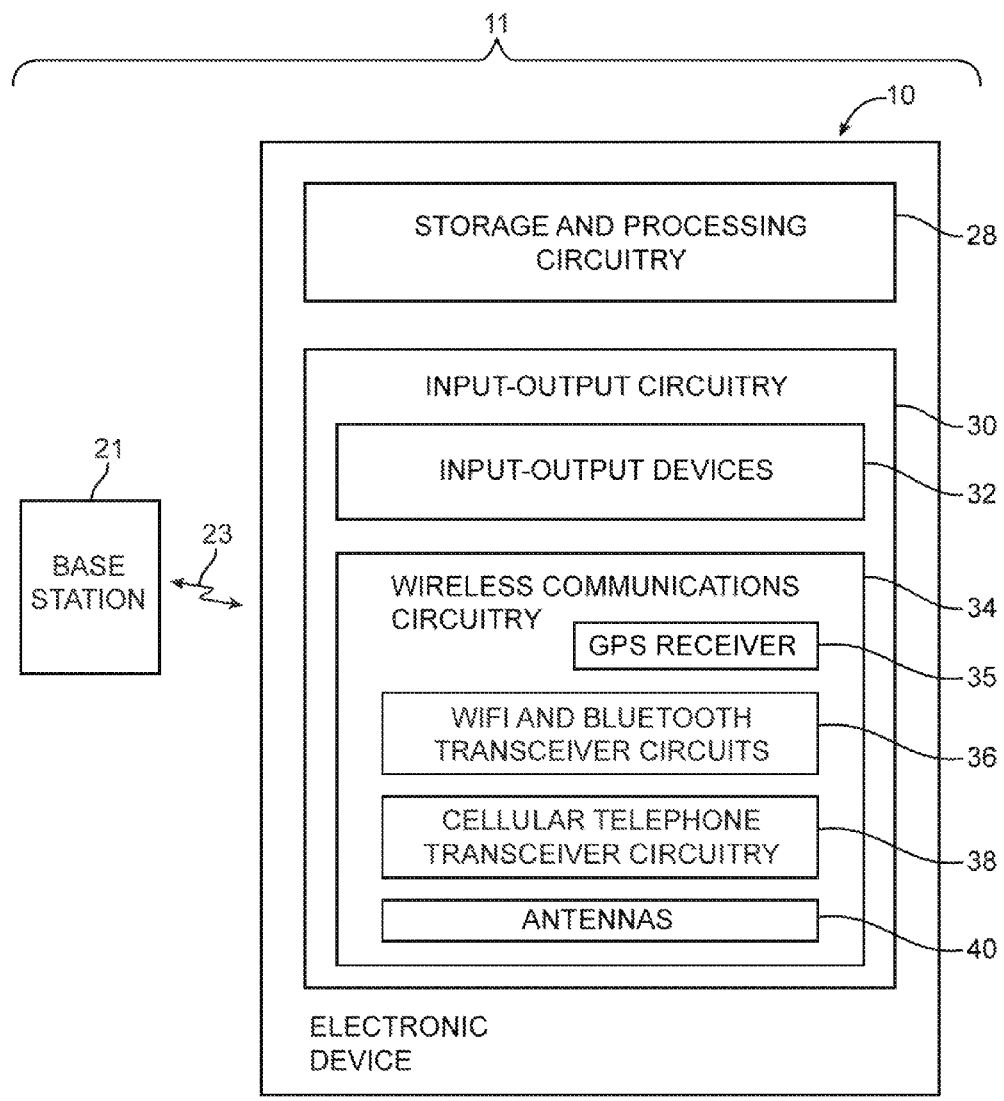
FIG. 2 is a schematic diagram of a wireless network including a base station and an illustrative electronic device with wireless communication circuitry having multiple antennas in accordance with an embodiment of the present invention.

A schematic diagram of a system in which electronic device 10 may operate is shown in FIG. 2. As shown in FIG. 2, system 11 may include wireless network equipment such as base station 21. Base stations such as base station 21 may be associated with a cellular telephone network or other wireless networking equipment. Device 10 may communicate with base station 21 over wireless link 23 (e.g., a cellular telephone link or other wireless communications link).

Device 10 may include control circuitry such as storage and processing circuitry 28. Storage and processing circuitry 28 may include storage such as hard disk drive storage, non-volatile memory (e.g., flash memory or other electrically-programmable-read-only memory configured to form a solid state drive), volatile memory (e.g., static or dynamic random-access-memory), etc. Processing circuitry in storage and processing circuitry 28 and other control circuits such as control circuits in wireless communications circuitry 34 may be used to control the operation of device 10. This processing circuitry may be based on one or more microprocessors, microcontrollers, digital signal processors, baseband processors, power management units, audio codec chips, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment such as base station 21, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, IEEE802.16 (WiMax) protocols, cellular telephone protocols such as the Long Term Evolution (LTE) protocol, Global System for Mobile Communications (GSM) protocol, Code Division Multiple Access (CDMA) protocol, and Universal Mobile Telecommunications System (UMTS) protocol, etc.

Circuitry 28 may be configured to implement control algorithms that control the use of antennas in device 10. For example, circuitry 28 may configure wireless circuitry 34 to switch a particular antenna into use for transmitting and/or receiving signals. Circuitry 28 may, as an example, configure wireless circuitry 34 to select an optimum antenna to use in performing system acquisition operations. Circuitry 28 may also be used in selecting an optimum antenna to use during normal operation, following system acquisition operations.

In some scenarios, circuitry 28 may be used in gathering sensor signals and signals that reflect the quality of received signals (e.g., received paging signals, received voice call traffic, received control channel signals, received data traffic, etc.). Examples of signal quality measurements that may be made in device 10 include bit error rate measurements, signal-to-noise ratio measurements, measurements on the amount of power associated with incoming wireless signals, channel quality measurements based on received signal strength indicator (RSSI) information (RSSI measurements), channel quality measurements based on received signal code power (RSCP) information (RSCP measurements), channel quality measurements based on signal-to-interference ratio (SINR) and signal-to-noise ratio (SNR) information (SINR and SNR measurements), channel quality measurements based on signal quality data such as Ec/Io or Ec/No data (Ec/Io and Ec/No measurements), etc. This information may be used in controlling which antenna is used. Antenna selections can also be made based on other criteria.

Input-output circuitry 30 may be used to allow data to be supplied to device 10 and to allow data to be provided from device 10 to external devices. Input-output circuitry 30 may include input-output devices 32. Input-output devices 32 may include touch screens, buttons, joysticks, click wheels, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 32 and may receive status information and other output from device 10 using the output resources of input-output devices 32.

Wireless communication circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals.

Wireless communication circuitry 34 may include satellite navigation system receiver circuitry such as Global Positioning System (GPS) receiver circuitry 35 (e.g., for receiving satellite positioning signals at 1575 MHz). Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands such as bands at 850 MHz, 900 MHz, 1800 MHz, 1900 MHz, and 2100 MHz or other cellular telephone bands of interest. Wireless communication circuitry 34 can include circuitry for other short-range and long-range wireless links if desired (e.g., WiMax circuitry, etc.). Wireless communications circuitry 34 may, for example, include, wireless circuitry for receiving radio and television signals, paging circuits, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communication circuitry 34 may include antennas 40. Antennas 40 may be formed using any suitable types of antenna. For example, antennas 40 may include antennas with resonating elements that are formed from loop antenna structures, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link antenna and another type of antenna may be used in forming a remote wireless link antenna. As described in connection with FIG. 1, there may be multiple cellular telephone antennas in device 10. For example, there may be one cellular telephone antenna in region 24 of device 10 and another cellular telephone antenna in region 22 of device 10. In a tablet computer or other types of electronic device, different antennas may be located along one of the edges of the device, different antennas may be located at various device corners, different antennas may be located on opposing device edges, etc. The antennas in device 10 may be fixed or may be tunable.

Figure 3:
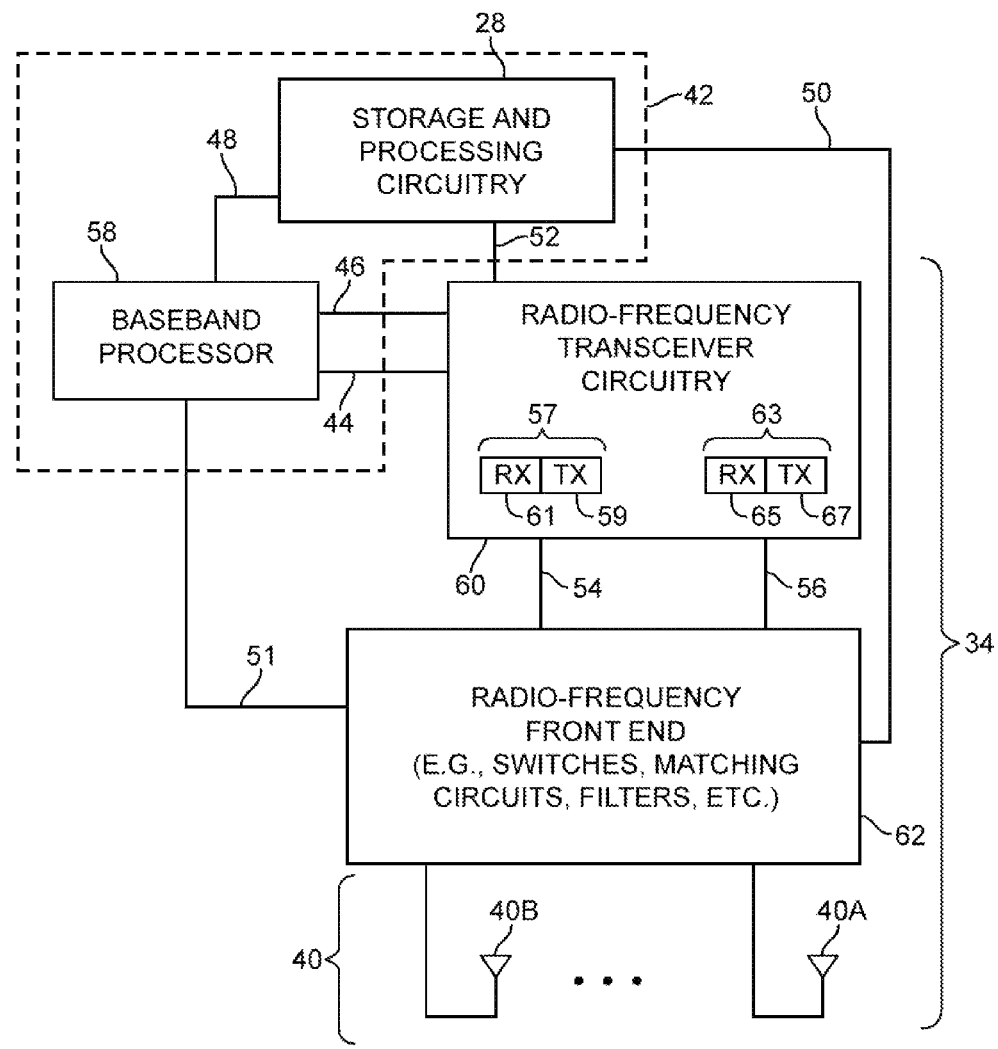
FIG. 3 is a diagram of illustrative wireless circuitry including multiple antennas and circuitry for controlling use of the antennas in accordance with an embodiment of the present invention.

Device 10 can be controlled by control circuitry that is configured to store and execute control code for implementing control algorithms (e.g., antenna selection algorithms and other wireless control algorithms). As shown in FIG. 3, control circuitry 42 may include storage and processing circuitry 28 (e.g., a microprocessor, memory circuits, etc.) and may include baseband processor 58. Baseband processor 58 may form part of wireless circuitry 34 and may include memory and processing circuits (i.e., baseband processor 58 may be considered to form part of the storage and processing circuitry of device 10).

Baseband processor 58 may provide data to storage and processing circuitry 28 via path 48. The data on path 48 may include raw and processed data associated with wireless (antenna) performance metrics for received signals such as received power (sometimes referred to as signal strength), transmitted power, frame error rate, bit error rate, channel quality measurements based on received signal strength indicator (RSSI) information, channel quality measurements based on received signal code power (RSCP) information, channel quality measurements based on signal-to-interference ratio (SINR) and signal-to-noise ratio (SNR) information, channel quality measurements based on signal quality data such as Ec/Io or Ec/No data, information on whether responses (acknowledgements) are being received from a cellular telephone tower corresponding to requests from the electronic device, information on whether a network access procedure has succeeded, information on how many re-transmissions are being requested over a cellular link between the electronic device and a cellular tower, information on whether a loss of signaling message has been received, and other information that is reflective of the performance of wireless circuitry 34. This information may be analyzed by storage and processing circuitry 28 and/or processor 58 and, in response, storage and processing circuitry 28 (or, if desired, baseband processor 58) may issue control commands for controlling wireless circuitry 34. For example, storage and processing circuitry 28 may issue control commands on path 52 and path 50 and/or baseband processor 58 may issue control commands on path 51.

Wireless circuitry 34 may include radio-frequency transceiver circuitry such as radio-frequency transceiver circuitry 60 and radio-frequency front-end circuitry 62. Radio-frequency transceiver circuitry 60 may include one or more radio-frequency transceivers such as transceivers 57 and 63 (e.g., one or more transceivers that are shared among antennas, one transceiver per antenna, etc.). In the illustrative configuration of FIG. 3, radio-frequency transceiver circuitry 60 has a first transceiver such as transceiver 57 that is associated with path (port) 54 (and which may be associated with path 44) and a second transceiver such as transceiver 63 that is associated with path (port) 56 (and which may be associated with path 46). Transceiver 57 may include a transmitter such as transmitter 59 and a receiver such as receiver 61 or may contain only a receiver (e.g., receiver 61) or only a transmitter (e.g., transmitter 59). Transceiver 63 may include a transmitter such as transmitter 67 and a receiver such as receiver 65 or may contain only a receiver (e.g., receiver 65) or only a transmitter (e.g., transmitter 59).

Baseband processor 58 may receive digital data that is to be transmitted from storage and processing circuitry 28 and may use path 46 and radio-frequency transceiver circuitry 60 to transmit corresponding radio-frequency signals. Radio-frequency front end 62 may be coupled between radio-frequency transceiver 60 and antennas 40 and may be used to convey the radio-frequency signals that are produced by transmitters 59 and 67 to antennas 40. Radio-frequency front end 62 may include radio-frequency switches, impedance matching circuits, filters, and other circuitry for forming an interface between antennas 40 and radio-frequency transceiver 60.

Incoming radio-frequency signals that are received by antennas 40 may be provided to baseband processor 58 via radio-frequency front end 62, paths such as paths 54 and 56, receiver circuitry in radio-frequency transceiver 60 such as receiver 61 at port 54 and receiver 63 at port 56, and paths such as paths 44 and 46. Baseband processor 58 may convert these received signals into digital data that is provided to storage and processing circuitry 28. Baseband processor 58 may also extract information from received signals that is indicative of signal quality for the channel to which the transceiver is currently tuned. For example, baseband processor and/or other circuitry in control circuitry 42 may analyze received signals to produce bit error rate measurements, measurements on the amount of power associated with incoming wireless signals, strength indicator (RSSI) information, received signal code power (RSCP) information, signal-to-interference ratio (SINR) information, signal-to-noise ratio (SNR) information, channel quality measurements based on signal quality data such as Ec/Io or Ec/No data, etc. This information may be used in controlling which antenna(s) to use in device 10. For example, a control algorithm running on control circuitry 42 may be used to switch a particular antenna into use for performing system acquisition operations or other functions based received signal strength information, signal power measurements associated with various channels, or other signal information.

Radio-frequency front end 62 may include a switch that is used to connect transceiver 57 to antenna 40B and transceiver 63 to antenna 40A or vice versa. The switch may be configured by control signals received from control circuitry 42 over path 50 and/or path 51. Circuitry 42 may, for example, adjust the switch to select which antenna is being used to transmit radio-frequency signals (e.g., when it is desired to share a single transmitter in transceiver 60 between two antennas) or which antenna is being used to receive radio-frequency signals (e.g., when it is desired to share a single receiver between two antennas).

If desired, antenna selection may be made by selectively activating and deactivating transceivers without using a switch in front end 62. For example, if it is desired to use antenna 40B, transceiver 57 (which may be coupled to antenna 40B through circuitry 62) may be activated and transceiver 63 (which may be coupled to antenna 40A through circuitry 62) may be deactivated. If it is desired to use antenna 40A, circuitry 42 may activate transceiver 63 and deactivate transceiver 57. Combinations of these approaches may also be used to select which antennas are being used to transmit and/or receive signals.

Control operations such as operations associated with configuring wireless circuitry 34 to transmit or receive radio-frequency signals through a desired one of antennas 40 may be performed using a control algorithm that is implemented on control circuitry 42 (e.g., using the control circuitry and memory resources of storage and processing circuitry 28 and baseband processor 58).

With one suitable arrangement, which is sometimes described herein as an example, control circuitry 42 may be used in controlling antenna selection to support system acquisition operations. System acquisition operations may be performed on power up or in response to detection of an out-of-service condition. By selecting an appropriate antenna to use during system acquisition operations, the ability of device 10 to form a communications link with base station 21 may be enhanced, particularly in situations in which the performance of one or more of the antennas in device 10 has been disrupted.

Control circuitry 42 may be used in measuring how much power is associated with various frequencies (i.e., different channel numbers) in system 11. Device 10 may, for example, use control circuitry 42 and wireless circuitry 34 to measure the signal power associated with each of a number of frequencies in a list of recently used frequencies (i.e., a channel history list). The signal strength at each frequency will be affected by factors such as the relative distance between device 10 and nearby base stations such as base station 21 of FIG. 2, the capabilities of each base station, and which antenna (e.g., 40A or 40B or other suitable antenna) is being used in making the signal strength measurements. To ensure that functions such as system acquisition operations are performed satisfactorily, control circuitry 42 may select a suitable antenna to use in performing system acquisition operations based on information such as signal strength information that has been gathered using control circuitry 42 and one or more of the antennas in device 10.

Figure 4:
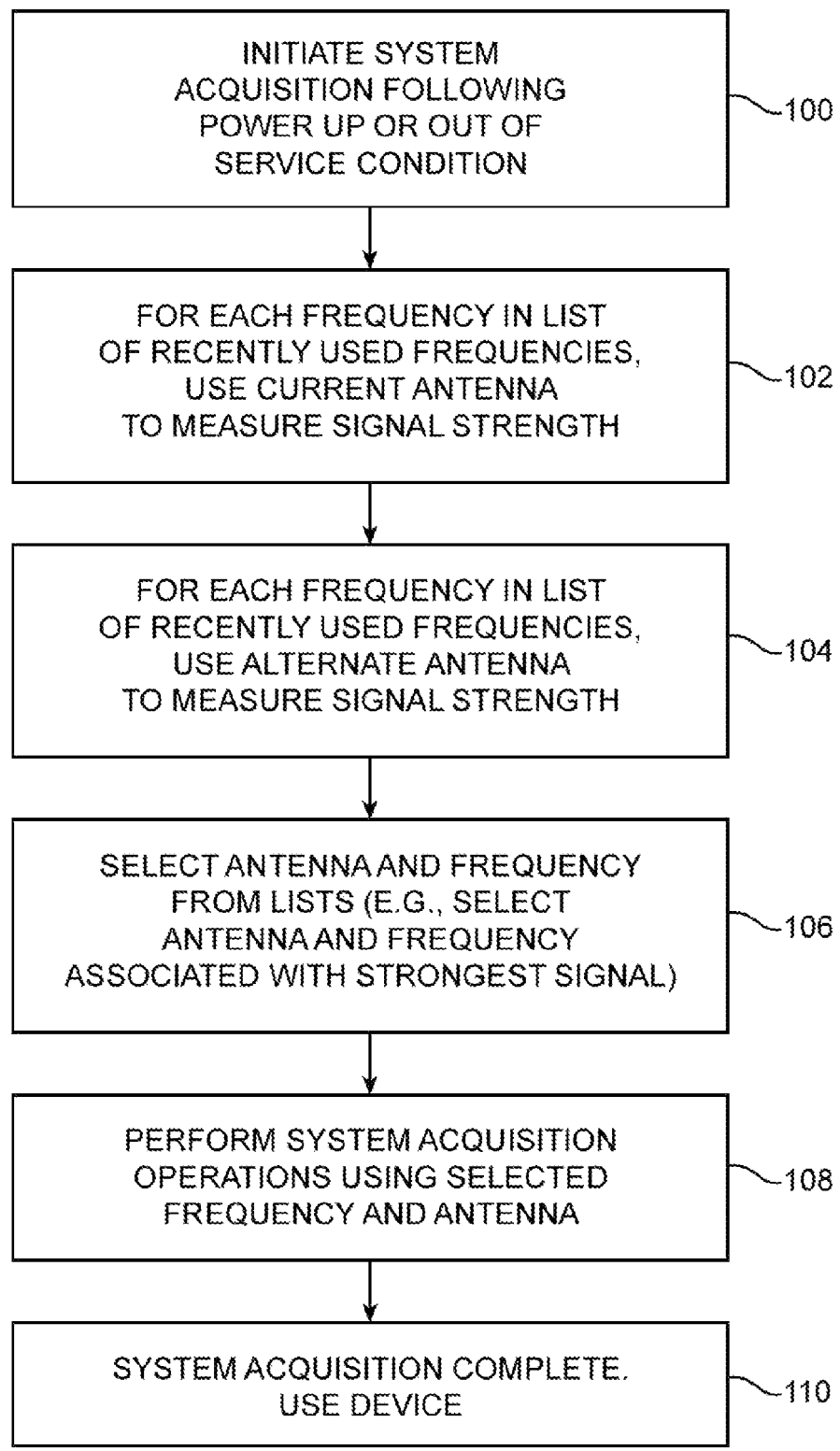
FIGS. 4 and 5 are flow charts of illustrative operations involved in using an electronic device with multiple antennas to perform system acquisition operations in accordance with an embodiment of the present invention.
Figure 5:
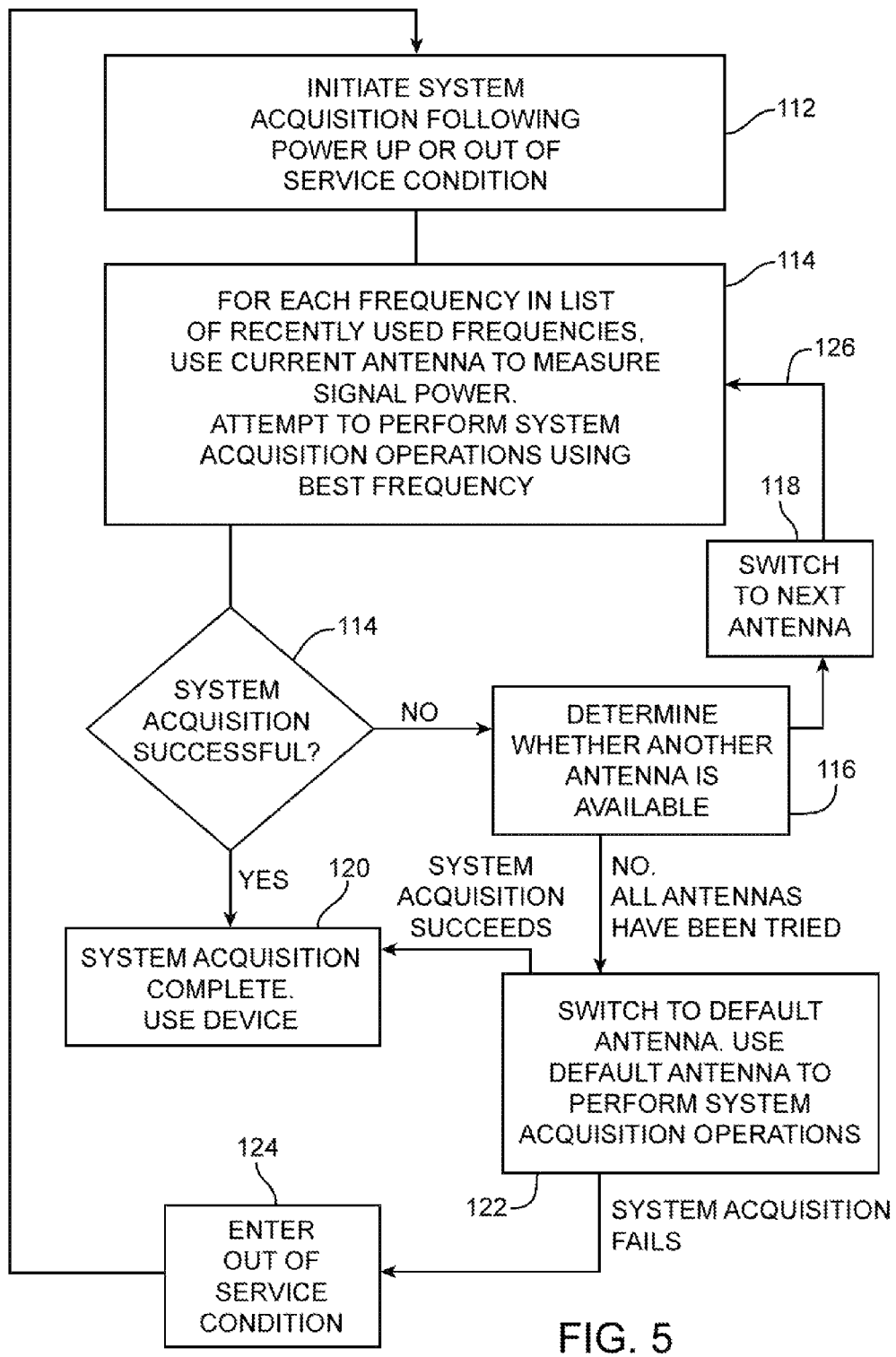

FIGS. 4 and 5 are flow charts of two illustrative ways in which device 10 may use control circuitry 42 to control the selection of a suitable antenna to use in performing system acquisition operations.

With the approach of FIG. 4, system acquisition operations may be initiated at step 100. In particular, device 10 may use control circuitry 42 to initiate system acquisition operations following power-up of device 10 or following an out-of-service condition.

To determine which antenna to use in performing system acquisition operations, device 10 may evaluate received signal strength (e.g., the amount of power received by device 10 using transceiver 60) using antennas 40. For example, in a configuration in which device 10 has first and second antennas 40, device 10 may use the first antenna to make received signal power measurements and may use the second antenna to make received signal power measurements. These signal power measurements (or other suitable signal measurements) may then be used by control circuitry 42 in evaluating which of the antennas should be selected to use in performing system acquisition operations. If, for example, the first antenna is disrupted due to the presence of an external object in the vicinity of that antenna, the first antenna may not perform as well as the second antenna. In response to detecting that the second antenna is able to receive stronger signals than the first antenna, control circuitry 42 may select the second antenna to use in performing system acquisition operations.

In making the measurements of steps 102 and 104, device 10 may evaluate signal strength (e.g., received signal power at device 10) for each frequency in a list of known frequencies (also sometimes referred to as channel numbers). The list of known frequencies may be a list of 5-10 frequencies or other suitable number of frequencies that have been most recently used by device 10 in conveying data traffic. Device 10 may maintain this type of frequency usage list during normal operation of device 10 in a cellular network. Maintaining a history of recently used frequencies may help device 10 rapidly identify a satisfactory frequency to use in communicating with the cellular network (e.g., as device 10 moves between cells in the wireless network).

As shown in FIG. 4, device 10 may gather information on the performance of the first antenna (i.e., the currently active antenna) during the operations of step 102. In particular, device 10 may make signal measurements such as received signal power measurements with the current antenna for each frequency in the list of recently used frequencies.

Device 10 may then, at step 104, gather information on the performance of the second antenna (sometimes referred to as the alternate antenna). In particular, device 10 may make signal measurements such as received signal power measurements with the alternate antenna for each frequency in the list of recently used frequencies.

After compiling information on the received signal power (or other signal strength measurement) for each of the recently used frequencies with both the current and alternate antennas, device 10 may select an appropriate antenna to use in performing system acquisition operations. In particular, during the operations of step 106, device 10 may analyze the measured signal power data to determine which measured signal power is greatest. The largest measured signal power may be associated with the current antenna or the alternate antenna and will be associated with a given one of the most recently used frequencies.

During step 106, after identifying the largest measured signal power and the corresponding frequency and antenna that were used in receiving signals at that power, device 10 may switch the appropriate antenna and frequency into use. For example, control circuitry 42 may configure transceiver circuitry 60 and/or switching circuitry 62 to route incoming signals from the antenna that is associated with the largest signal power to an active transceiver while adjusting the transceiver to operate at the frequency that is associated with the largest measured signal power.

During step 108, device 10 may then use the selected antenna and frequency to perform system acquisition operations (i.e., to establish a wireless communications link between device 10 and base station 21).

At step 110, the wireless link that was established during the operations of step 108 may be used in communicating data traffic between device 10 and base station 21 (e.g., data associated with a voice call or a data session).

Although described in the context of a device that contains two antennas, device 10 may, if desired, contain three or more antennas. In this type of arrangement, signal power measurements for each of the three or more antennas may be made before evaluating the signal power measurements to determine which of the antennas is to be used in performing system acquisition operations.

With the illustrative approach of FIG. 5, device 10 may evaluate the performance of alternate antennas only in the event that the current antenna is not performing satisfactorily. Device 10 may, for example, evaluate the performance of each antenna in turn until a satisfactory antenna is identified.

As shown in FIG. 5, device 10 may initiate system acquisition operations at step 112 (e.g., in response to a power up event or in response to detection of an out-of-service condition). At step 114, device 10 may use the currently active antenna (e.g., a default antenna or most recently used antenna) to measure received signal strength (e.g., received signal power) for each frequency in a list of known (e.g., recently used) frequencies (e.g., 5-10 most recently used frequencies or other suitable number of most recently used frequencies). Device 10 may then identify which of the measured signal powers is greatest and may attempt to perform system acquisition operations using the frequency associated with the largest measured signal power.

Device 10 may determine whether system acquisition operations were successful at step 114. If system acquisition operations are successful, device 10 may use a wireless communications link that is established during system acquisition operations to convey data traffic to and from base station 21 (step 120).

If, however, system acquisition operations were not successful using the current antenna, device 10 may, at step 116, determine whether another of antennas 40 is available (i.e., device 10 can, in response to determining that system acquisition operations with the current antenna were unsuccessful, determine whether all of antennas 40 have been evaluated or whether antennas remain that have yet to be evaluated). If it is determined during the operations of step 116 that additional antennas are available for evaluation, device 10 may, at step 118, switch the next available antenna into use using transceiver circuitry 60 and/or switching circuitry 62. Processing may then loop back to step 114, as indicated by line 126, so that device 10 can evaluate the performance of the new current antenna.

If it is determined at step 116 that no additional antennas are available for testing (i.e., if device 10 has already made received signal power measurements using each of the antennas in device 10), device 10 can, at step 122, direct transceiver circuitry 60 and/or switching circuitry 62 to switch a default antenna into use. The default antenna may be, for example, the lower antenna in device 10 of FIG. 1. System acquisition operations may be performed using the default antenna during step 122. If system acquisition operations during step 122 are successful, device 10 may use the communications link that was established during the system acquisition operations to carry normal data traffic (step 120). If system acquisition operations during step 122 are unsuccessful, device 10 may enter an out-of-service condition (step 124). Following the out-of-service condition or in response to other events such as a power-up event, device 10 can initiate system acquisition operations (step 112).

The foregoing is merely illustrative of the principles of this invention and various modifications can be made by those skilled in the art without departing from the scope and spirit of the invention.

What is claimed is:

1. A method for using an electronic device that has a plurality of antennas to perform system acquisition operations to establish a wireless communications link with a wireless network, comprising:
    using only a selected one of the antennas to measure received power at each of a plurality of frequencies;
    identifying which of the frequencies is associated with a largest of the measured received powers;
    using the identified frequency and the selected antenna to perform system acquisition operations to attempt to establish the wireless communications link with the wireless network;
    determining whether the system acquisition operations with the selected antenna were successful at establishing the wireless communications link;
    in response to determining that the system acquisition operations with the selected antenna were unsuccessful at establishing the wireless communications link, switching an additional one of the antennas into use to measure received power in each of the plurality of frequencies; and
    in response to determining that the system acquisition operations with the selected antenna were successful at establishing the wireless communications link, performing wireless communications over the wireless communications link.

2. The method defined in claim 1 further comprising:
    after switching the additional one of the antennas into use, measuring received signal power in each of the plurality of frequencies using the additional one of the antennas.

3. The method defined in claim 2 further comprising:
    identifying which of the frequencies is associated with a largest of the measured received powers measured using the additional one of the antennas; and
    at the identified frequency associated with the largest of the measured received powers measured using the additional one of the antennas, using the additional one of the antennas to perform system acquisition operations to attempt to establish the wireless communications link with the wireless network.

4. The method defined in claim 3 further comprising:
    maintaining a list of the plurality of frequencies in the electronic device.

5. The method defined in claim 4 wherein the list of the plurality of frequencies comprises a list of frequencies most recently used to convey wireless traffic for the electronic device.

6. The method defined in claim 1 wherein the electronic device comprises a portable electronic device having a rectangular housing with upper and lower ends, wherein an upper antenna is located in the upper end and a lower antenna is located in the lower end, and wherein switching the additional one of the antennas into use comprises switching the upper antenna into use in place of the lower antenna.

7. The method defined in claim 1 further comprising:
    maintaining a list of the plurality of frequencies in the electronic device.

8. The method defined in claim 7 wherein the list of the plurality of frequencies comprises a list of frequencies most recently used to convey wireless traffic for the electronic device.

9. A method for using an electronic device that has a plurality of antennas to perform system acquisition operations to establish a wireless communications link with a wireless network, wherein each antenna of the plurality of antennas is coupled to a different respective transceiver, the method comprising:
    using each of the plurality of antennas to measure received power in each of a plurality of frequencies by selectively activating the different respective transceivers coupled to each antenna of the plurality of antennas;
    identifying which of the plurality of antennas and which of the frequencies is associated with a largest of the measured received powers; and
    using the identified frequency and the identified antenna to perform system acquisition operations to attempt to establish the wireless communications link with the wireless network.

10. The method defined in claim 9 further comprising:
    maintaining a list of the plurality of frequencies in the electronic device.

11. The method defined in claim 10 wherein the list of the plurality of frequencies comprises a list of frequencies most recently used to convey wireless traffic for the electronic device.

12. The method defined in claim 9 wherein the electronic device comprises a portable electronic device having a rectangular housing with upper and lower ends, wherein an upper antenna is located in the upper end and a lower antenna is located in the lower end, and wherein the identified antenna comprises the upper antenna.

13. The method defined in claim 12 further comprising:
    maintaining a list of the plurality of frequencies in the electronic device.

14. The method defined in claim 13 wherein the list of the plurality of frequencies comprises a list of frequencies most recently used to convey wireless traffic for the electronic device.

15. A method of performing system acquisition operations with a wireless electronic device to attempt to establish a wireless communications link with a wireless network, comprising:

using at least one of a plurality of antennas in the wireless electronic device to make wireless signal power measurements; and based on the wireless signal power measurements, selecting a given one of the plurality of antennas to use in performing the system acquisition operations, wherein the wireless electronic device comprises a portable electronic device having a rectangular housing with upper and lower ends, wherein an upper antenna is located in the upper end and a lower antenna is located in the lower end, and the selected antenna comprises the lower antenna.

16. The method defined in claim 15 further comprising:

with control circuitry in the wireless electronic device, maintaining a list of frequencies that have recently been used by the wireless electronic device in communicating with the wireless network.

17. The method defined in claim 16 wherein using the at least one of the plurality of antennas comprises using at least a first of the antennas to measure received signal power for each of the frequencies in the list of frequencies.

18. The method defined in claim 17 wherein using the at least one of the plurality of antennas comprises using at least a second of the antennas to measure received signal power for each of the frequencies in the list of frequencies.

19. The method defined in claim 18 wherein selecting the given one of the plurality of antennas comprises selecting a given one of the first and second antennas.

20. The method defined in claim 19 wherein selecting the given one of the first and second antennas comprises identifying which of the first and second antennas is associated with a largest of the measured received signal powers.

\* \* \* \* \*

UNITED STATES PATENT AND TRADEMARK OFFICE
CERTIFICATE OF CORRECTION

| | | |
|---|---|---|
| PATENT NO. | : 8,874,041 B2 | Page 1 of 1 |
| APPLICATION NO. | : 13/252045 | |
| DATED | : October 28, 2014 | |
| INVENTOR(S) | : Gaurav Nukala et al. | |

It is certified that error appears in the above-identified patent and that said Letters Patent is hereby corrected as shown below:

ON THE TITLE PAGE ITEM 75

Please change the name of the fourth inventor from "Venkatasubramanian Ramasamy" to "Ramasamy Venkatasubramanian"

Signed and Sealed this
Twenty-sixth Day of January, 2016

Michelle K. Lee
*Director of the United States Patent and Trademark Office*